Patented Dec. 3, 1946

2,411,959

UNITED STATES PATENT OFFICE 2,411,959

METHOD OF PURIFYING PETROLEUM PRODUCTS

Melvin A. Dietrich, Claymont, Del., and Charles J. Pedersen, Penns Grove, N. J., assignors to E. I. du Pont de Nemours & Company, Wilmington, Del., a corporation of Delaware No Drawing. Original application November 25, 1943, Serial No. 511,736. Divided and this application January 18, 1946, Serial No. 642,134

6 Claims. (Cl. 196—30)

This invention relates to methods for purifying organic substances and particularly to purifying water-immiscible organic substances which are contaminated with catalytically active metal compounds.

This is a division of our copending application Serial No. 511,736 filed November 25, 1943.

Many organic products tend to deteriorate on aging, especially when exposed to free contact with the atmosphere. This deterioration generally involves autooxidation due to the reaction of the organic substances with molecular oxygen. It has been proposed to overcome this difficulty by incorporating in the organic substances various compounds which inhibit or retard the deterioration and which are generally known as antioxidants. Frequently, such organic substances become contaminated with catalytically active compounds of heavy metals, such as copper, iron, cobalt, manganese and vanadium, which speed the aging of the organic substances and the oxidation of the antioxidants themselves, thereby rendering the stabilization with antioxidants more difficult. An example of this is in the copper sweetening of gasoline wherein traces of copper frequently remain in the gasoline and greatly shorten its useful life. It has been proposed to overcome the effect of such metals by adding, to the organic substances contaminated therewith, a metal deactivator which reacts with the metal and renders it catalytically inactive. Methods have also been proposed for removing catalytically active metals from such contaminated organic substances. A common and well known example of this is the washing of copper sweetened gasoline with an aqueous solution of sodium sulfide for removing copper remaining in the gasoline.

It is an object of the present invention to provide a new and improved method of purifying water-immiscible organic substances contaminated with dissolved catalytically active compounds of the group of copper, iron, cobalt, manganese and vanadium. A more particular object is to provide a new and improved process for removing soluble copper compounds from cracked gasoline and especially from copper sweetened gasoline. Another object is to provide such a method wherein the organic substance is washed with an aqueous solution of a compound which is unusually effective for the purpose and is much more effective than sodium sulfide. A still further object is to provide such a method, employing aqueous solutions of compounds which are more soluble in water than in the organic substance being treated. Still other objects will appear hereinafter.

The above and other objects may be accomplished in accordance with our invention which comprises washing the contaminated water-immiscible organic substances in the liquid state with a dilute aqueous solution of a compound of the class of organic thiols containing from 1 to 10 carbon atoms and at least 1 water-solubilizing group and water-soluble salts of such thiols. We have found that, by this procedure, we are able to very effectively remove from the organic substances, dissolved catalytically active compounds of heavy metals of the group of copper, iron, cobalt, manganese and vanadium. This was particularly unexpected since the thiols and their water-soluble salts are generally more soluble in water than in the organic substances being treated. It was especially surprising to find that such thiols and their water-soluble salts are far superior to sodium sulfide when employed in the same manner and remove the catalytically active metal compounds from the organic substances much more completely.

The organic substances, which may be treated in accordance with our invention, are those organic substances which are immiscible with water and which are liquid at ordinary temperatures or which may become liquid at higher temperatures up to about 100° C. Our invention is particularly applicable to the treatment of petroleum products, such as gasoline, fuel oil, lubricating oils and the like. Our invention is especially directed to the purification of copper sweetened cracked gasoline.

Our process may be employed for removing dissolved catalytically active compounds of heavy metals, such as copper, iron, cobalt, manganese and vanadium. It is particularly effective for removing dissolved catalytically active compounds of copper from organic substances and particularly from petroleum products, such as copper sweetened cracked gasoline.

We have found that organic thiols, containing from 1 to 10 carbon atoms and at least 1 solubilizing group and the water-soluble salts of such thiols, when employed in an aqueous solution, are very effective for removing catalytically active compounds of heavy metals from water-immiscible organic substances contaminated therewith. These compounds may be represented by the formula $$M-S-R$$

wherein M represents hydrogen, ammonium or alkali metal and R represents a polyvalent organic radical containing from 1 to 10 carbon atoms and 1 or more water-solubilizing groups. Representative water-solubilizing groups are —OH, —SM, —COOM, —SO$_2$M, —SO$_3$M, —PO$_2$MM, —PO$_3$MM, —NH$_2$ and =NH wherein M represents hydrogen, ammonium or alkali metal. Preferably, the thiols and their salts are more soluble in water than in the organic substance to be purified. Water-soluble organic thiols and water-soluble salts thereof are those which are soluble in water to the extent of at least 0.1% at the temperature at which the treatment is to take place. The term "organic thiols" will be understood to include compounds, such as thiourea, thiosemicarbazide and N-guanylthiourea, which, as originally written, do not appear to have a mercapto group in the structural formulae, but which exist in tautomeric forms, one of which contains a mercapto group. For example, thiourea exists in the following 2 forms:

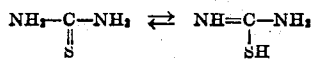

When the thiols are sufficiently basic to react with acids, they may be employed as their water-soluble salts of acids, such as hydrochloric acid, carbonic acid and the like. When the thiols are sufficiently acidic to react with strong bases, they may be employed as their water-soluble salts of bases, such as ammonia, sodium, potassium and the like.

Ordinarily, the aqueous solutions will be dilute, containing the thiol or its water-soluble salt in a concentration of from 0.1 to 10%. It will generally be preferred to employ them in a concentration of about 1%. Higher concentrations than 10% may be employed where the thiol or its water-soluble salt is sufficiently soluble in water. The upper concentration which may be used will be fixed by the solubility of the thiol or its salt.

Where the organic substance to be purified is a liquid at atmospheric temperatures, it will generally be found most convenient to carry out the washing at atmospheric temperatures. Where the organic substance is quite volatile, lower temperatures down to just above the freezing point of the aqueous solution may be employed. In other cases, where the organic substance melts at a temperature between atmospheric temperatures and 100° C. and where the organic substance is quite viscous at atmospheric temperatures, it will generally be desired to employ temperatures above atmospheric up to about 100° C. In some cases, it will be possible to operate at temperatures above 100° C. by employing pressures sufficient to avoid vaporization of the aqueous medium. Any method of intimately contacting the organic substance with the aqueous washing solution, such as mechanical agitation in a tank or other vessel or counterflow contact through a packed vertical tower, may be employed.

In order to more clearly illustrate our invention, the preferred modes of carrying the same into effect and the advantageous results to be obtained thereby, specific experiments are given as follows:

A quantity of cracked gasoline, completely refined but otherwise untreated with chemical additives such as dyes and anti-knocks, was contaminated with 1 part per million of copper as cupric oleate. Four hundred cc. of the copper containing gasoline were vigorously shaken 300 times at room temperature with 40 cc. of aqueous solutions of the copper removing compounds in a 1-liter separatory funnel. The gasoline was separated, dried, and filtered by gravity through paper. The induction periods of untreated and treated samples of gasoline and their response to a commercial antioxidant (p-(n-butylamino)-phenol, abbreviated BuPAP) were determined by the accelerated method described in J. I. E. C. 25 (397 (1933)). This method consists in heating 100 cc. of gasoline at 100° C. in a 1-liter Pyrex flask containing pure oxygen. The internal pressure is observed every 10 minutes by means of a manometer attached to the system. The elapsed time, from the start of the test until the gasoline begins to absorb oxygen at the rate of 10 cc. per 10 minutes or higher, as shown by the fall in internal pressure, is taken as the induction period. It has been found that the induction period, obtained by this method, although greatly shortened, is a fairly accurate measure of the relative stability of gasoline under normal storage conditions.

The results of these tests are shown in Tables I and II.

*Table I*

| No. | Treatment | Induction period in minutes | |
|---|---|---|---|
| | | No BuPAP | 0.0025% BuPAP |
| 1 | None (no copper added) | 130 | 380 |
| 2 | 1 P. P. M. Cu | About 20 | 65 |
| | Plus 1 P. P. M. Cu and shaken with the following aqueous solutions: | | |
| 3 | 1% N-guanylthiourea carbonate | 115 | 330 |
| 4 | 1% thiosemicarbazide | 105 | 325 |
| 5 | 1% beta-hydroxyethyl mercaptan | 90 | 340 |
| 6 | 1% cysteine hydrochloride | 100 | 300 |
| 7 | 1% decanedithiol-1,10 | 95 | 290 |
| 8 | 10% sodium sulfide | 60 | 250 |
| 9 | 1% lauryl mercaptan | 30 | 80 |

It will be observed that 1% solutions of the organic reagents belonging to this class are more effective that even 10% sodium sulfide, a compound widely used by the petroleum industry for the removal of copper from copper sweetened gasoline. It will also be noted that a mercaptan, not possessing water-solubilizing groups in addition to the —SH (lauryl mercaptan), is practically ineffective.

*Table II*

| No. | Treatment | Induction period in minutes | |
|---|---|---|---|
| | | No BuPAP | 0.0025% BuPAP |
| 1 | None (no Cu added) | 180–195 | 465–475 |
| 2 | Plus 1 P. P. M. Cu | 25 | 65 |
| | Plus 1 P. P. M. Cu and shaken with the following aqueous solutions: | | |
| 3 | 1% thiourea | 180 | 465 |
| 4 | 1% sodium thioglycolate | 150 | 445 |
| 5 | 1% thiosorbitol | 155 | 355 |
| 6 | 1% sodium sulfide | 40 | 90 |

It will be seen that the organic reagents are much superior to sodium sulfide of equal solution strength.

In order to show that the catalytically active metal is actually removed from the organic substance by our method, rather than merely deactivated, a benzene solution was prepared containing 0.05 g. of copper (as copper naphthenate) per 100 cc. of solution. This solution was shaken with an equal volume of a 1% aqueous solution of thiosorbitol. The green color disappeared from the benzene layer which became colorless.

The benzene layer was then separated from the aqueous solution and was evaporated on a steam bath, leaving a trace of a brownish oil which was not water-soluble. Similar experiments were conducted with gasoline, fuel oil and an SAE 30 lubricating oil with like results. The washing with the aqueous solution removed the copper from the organic substances.

It will be understood that the above experiments are given for illustrative purposes only and that many variations and modifications can be made therein without departing from the spirit or scope of our invention. For example, the concentrations of the thiols and their salts in the aqueous solutions may be varied; the amount of the solution employed and the extent of treatment of the organic substance therewith will vary; other solvents, such as methanol and acetone, may be added to the aqueous solutions and other thiols and their salts, within the scope of our invention, may be substituted for those employed in the experiments. Other representative thiols and their salts, which are effective and which come within the scope of our invention, are—

Beta-amino ethyl mercaptan
Beta-mercapto ethyl sulfonic acid
Beta-mercapto ethyl phosphonic acid
Dithiourea (tautomeric)
Beta-phenylaminoethane thiol
Beta - (o-hydroxycyclohexylamino) ethane thiol
Hydroxybenzal thiosemicarbazide It will thus be seen that, by our invention, we have provided a very effective method for removing catalytically active compounds of heavy metals from organic substances and particularly from petroleum products, such as copper sweetened cracked gasoline. Our agents are more effective than the well known sodium sulfide method, even when the sodium sulfide is employed in a concentration of 10 times that of our compounds. Accordingly, we believe that our invention constitutes a substantial advance in the art.

We claim:

1. The method of purifying petroleum products contaminated with dissolved catalytically active compounds of heavy metals selected from the group consisting of copper, iron, cobalt, manganese, and vanadium which comprises washing the petroleum product in the liquid state with a dilute aqueous solution of a member of the group consisting of thiourea, thiosemicarbazide, N-guanylthiourea, beta-amino ethyl mercaptan and dithiourea.

2. The method of purifying petroleum products contaminated with dissolved catalytically active compounds of heavy metals selected from the group consisting of copper, iron, cobalt, manganese and vanadium which comprises washing the petroleum product in the liquid state with a dilute aqueous solution of thiourea.

3. The method of purifying petroleum products contaminated with dissolved catalytically active compounds of copper which comprises washing the petroleum product in the liquid state with a dilute aqueous solution of a member of the group consisting of thiourea, thiosemicarbazide, N-guanylthiourea, beta-amino ethyl mercaptan and dithiourea.

4. The method of purifying petroleum products contaminated with dissolved catalytically active compounds of copper which comprises washing the petroleum product in the liquid state with a dilute aqueous solution of thiourea.

5. The method of purifying copper sweetened cracked gasoline contaminated with dissolved catalytically active compounds of heavy metals selected from the group consisting of copper, iron, cobalt, manganese and vanadium which comprises washing the gasoline in the liquid state with a dilute aqueous solution of a member of the group consisting of thiourea, thiosemicarbazide, N-guanylthiourea, beta-amino ethyl mercaptan and dithiourea.

6. The method of purifying copper sweetened cracked gasoline contaminated with dissolved catalytically active compounds of heavy metals selected from the group consisting of copper, iron, cobalt, manganese and vanadium which comprises washing the gasoline in the liquid state with a dilute aqueous solution of thiourea.

MELVIN A. DIETRICH.
CHARLES J. PEDERSEN.